US009226566B2

(12) United States Patent
Nakatani et al.

(10) Patent No.: US 9,226,566 B2
(45) Date of Patent: Jan. 5, 2016

(54) INFORMATION PROCESSING APPARATUS

(71) Applicant: Panasonic Corporation, Kadoma-shi, Osaka (JP)

(72) Inventors: Hitoshi Nakatani, Osaka (JP); Akira Iwamoto, Osaka (JP); Takeshi Mori, Osaka (JP); Yuichiro Tachibana, Osaka (JP); Hideo Nishimatsu, Osaka (JP); Hiroaki Nishimura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 270 days.

(21) Appl. No.: 13/764,385

(22) Filed: Feb. 11, 2013

(65) Prior Publication Data
US 2014/0054337 A1    Feb. 27, 2014

(30) Foreign Application Priority Data

Aug. 23, 2012  (JP) ................................. 2012-184370

(51) Int. Cl.
*A45F 3/14*  (2006.01)
*A45F 5/00*  (2006.01)
*A45C 11/00*  (2006.01)

(52) U.S. Cl.
CPC . *A45F 5/00* (2013.01); *A45C 11/00* (2013.01); *A45C 2011/003* (2013.01); *A45F 2005/008* (2013.01); *A45F 2200/0525* (2013.01)

(58) Field of Classification Search
CPC ............................. A45F 5/00; A45F 2005/008
USPC ........................... 224/218, 651, 219, 222, 250
See application file for complete search history.

(56) References Cited

U.S. PATENT DOCUMENTS

| 2,038,952 | A  | * | 4/1936  | Niedorff et al. ............... 224/218 |
| 2,876,022 | A  | * | 3/1959  | Kroviak .......................... 108/43 |
| 4,747,633 | A  | * | 5/1988  | Stacy ............................. 294/1.3 |
| 5,169,191 | A  | * | 12/1992 | Benz ......................... 56/400.01 |
| 6,109,434 | A  | * | 8/2000  | Howard, Jr. ................... 206/320 |
| 6,360,928 | B1 | * | 3/2002  | Russo ............................ 224/218 |
| 6,735,698 | B1 | * | 5/2004  | Callam ........................... 726/35 |
| 7,469,809 | B2 | * | 12/2008 | Rodarte et al. ................ 224/578 |
| 7,976,083 | B2 | * | 7/2011  | Black et al. .................... 294/1.3 |
| D650,531  | S  | * | 12/2011 | Young et al. ............. D29/120.1 |
| 8,405,981 | B2 | * | 3/2013  | Takemasa et al. ....... 361/679.59 |
| 8,550,317 | B2 | * | 10/2013 | Hyseni .......................... 224/197 |

(Continued)

FOREIGN PATENT DOCUMENTS

JP         63-155555       10/1988
WO    WO 2009/101800      8/2009

*Primary Examiner* — Justin Larson
*Assistant Examiner* — Lester L Vanterpool
(74) *Attorney, Agent, or Firm* — Hamre, Schumann, Mueller & Larson, P.C.

(57) ABSTRACT

An information processing apparatus 100 includes: a first casing 101 having an operation section 110 provided on a top surface; a second casing 102 having a display provided thereon; an opening and closing mechanism 120 configured to connect a far side portion of the first casing 101 to the second casing 102 such that the information processing apparatus 100 is openable and closable; and a belt 150 provided on a back surface side of the first casing 101. The belt 150 extends diagonally on a back surface 101a of the first casing 101 from a mounting portion provided on one side surface 101b side of the first casing 101, so as to approach the far side portion of the first casing 101 as a distance from the one side surface 101b side is increased, and reaches a mounting portion provided on a far side of the first casing 101.

3 Claims, 6 Drawing Sheets

(56) References Cited

U.S. PATENT DOCUMENTS

| | | | |
|---|---|---|---|
| 8,827,234 B2* | 9/2014 | Baker | 248/682 |
| 2006/0113342 A1* | 6/2006 | Hampton et al. | 224/409 |
| 2007/0247801 A1* | 10/2007 | Bekele | 361/683 |
| 2009/0219677 A1* | 9/2009 | Mori et al. | 361/679.03 |
| 2010/0296235 A1 | 11/2010 | Takemasa et al. | |
| 2011/0303709 A1* | 12/2011 | Wizikowski | 224/218 |
| 2012/0024917 A1* | 2/2012 | Case et al. | 224/259 |
| 2012/0104059 A1* | 5/2012 | Yen | 224/218 |

* cited by examiner

INFORMATION PROCESSING APPARATUS

BACKGROUND

1. Field

The present disclosure relates to an information processing apparatus having a belt used for holding the information processing apparatus.

2. Description of the Related Art

WIPO publication No. WO2009/101800 discloses an information processing apparatus having: a back surface side casing section; a front surface side casing section opposing the back surface side casing section; a projection that is provided in a back surface portion of the back surface side casing section so as to project outward; and a belt fixed to the back surface side casing section so as to cover the projection. The belt has a penetration portion positioned so as to oppose a top portion of the projection. A user holds the apparatus so as to cover and grasp the projection with the palm of the user's one hand. At this time, a third joint of an index finger, a middle finger, a ring finger, or the like of the one hand, is protruded through the penetration portion. Thus, the back surface side casing section can be in very close contact with the one hand.

SUMMARY

The present disclosure is to make available an information processing apparatus having a belt effective for enhancing stability with which a user holds the information processing apparatus.

An information processing apparatus of the present disclosure includes: a first casing having an operation section provided on a top surface; a second casing having a display provided thereon; an opening and closing mechanism configured to connect a far side portion of the first casing to the second casing such that the information processing apparatus is openable and closable; and a belt provided on a back surface side of the first casing, and the belt extends diagonally on a back surface of the first casing from a mounting portion provided on one side surface side of the first casing, so as to approach the far side portion of the first casing as a distance from the one side surface side is increased, and reaches a mounting portion provided on a far side of the first casing.

Further, an information processing apparatus of the present disclosure includes: a casing having a display and an operation section provided on a top surface; and a belt provided on a back surface side of the casing, and the display is capable of displaying an image such that a first edge that is a part of an outer circumference of the casing corresponds to an upper side of the image, and, in a usage state where the first edge of the casing corresponds to the upper side, the belt extends diagonally on a back surface of the casing from a mounting portion provided on one side surface side so as to approach the first edge as a distance from the one side surface side is increased, and reaches a mounting portion provided on the first edge side.

Further, according to the present disclosure, a belt, for use in an information processing apparatus, which is mounted, in the information processing apparatus, to a casing having an operation section provided on a top surface, and which forms a gap between the belt and a back surface of the casing, includes: a belt body portion; a mounting end provided at an end portion of the belt body portion, and mounted to the casing; and a folded-back portion that is provided near the mounting end and is bent toward a back side of the belt body portion and folded back.

The information processing apparatus of the present disclosure is effective for enhancing stability with which a user holds the information processing apparatus.

DETAILED DESCRIPTION

Hereinafter, an embodiment will be described in detail with reference to the drawings as necessary. However, unnecessarily detailed description may not be given. For example, matters that have been already well known may not be described in detail or substantially the same components may not be repeatedly described. This is because the following description is prevented from being redundant, in order to allow a person of ordinary skill in the art to easily understand the embodiment.

The inventors provide the following description and the accompanying drawings in order to allow a person of ordinary skill in the art to sufficiently understand the present disclosure, and the description and the drawings are not intended to restrict the subject matter of the scope of claim for patent.

First Embodiment

Hereinafter, a first embodiment will be described with reference to FIG. 1 to FIG. 6.

[1-1. Structure of Information Processing Apparatus]

Figure 1:
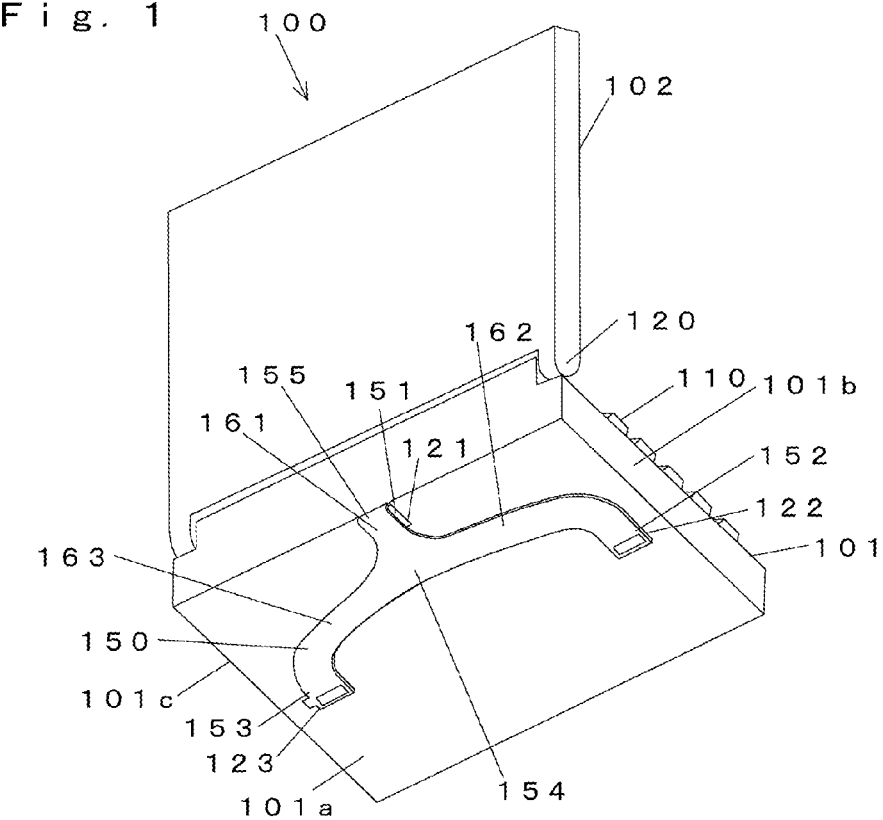
FIG. 1 is a perspective view of a back side of an information processing apparatus according to a first embodiment.
Figure 2:
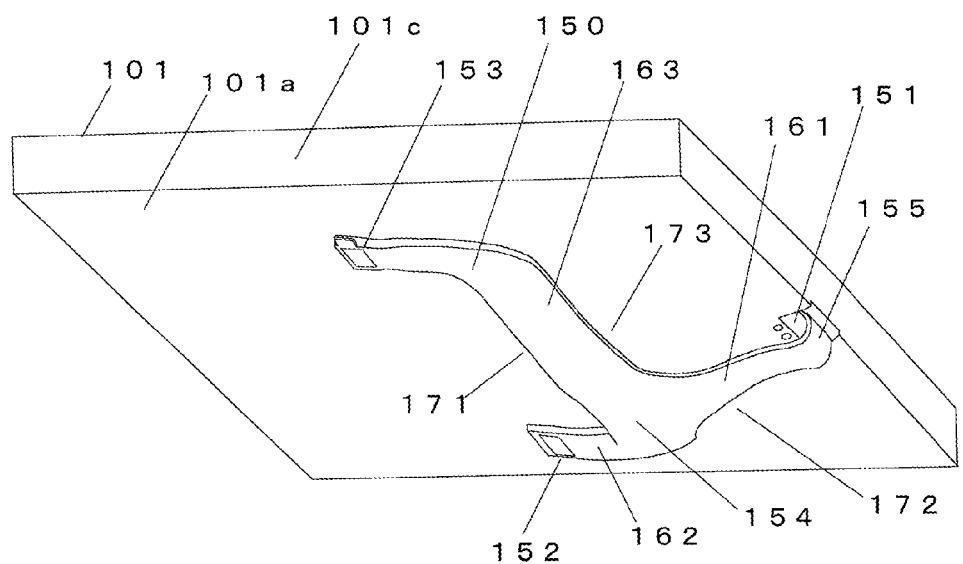
FIG. 2 is a perspective view of the back side of the information processing apparatus according to the first embodiment, as viewed from an angle different from that in FIG. 1.
Figure 3:
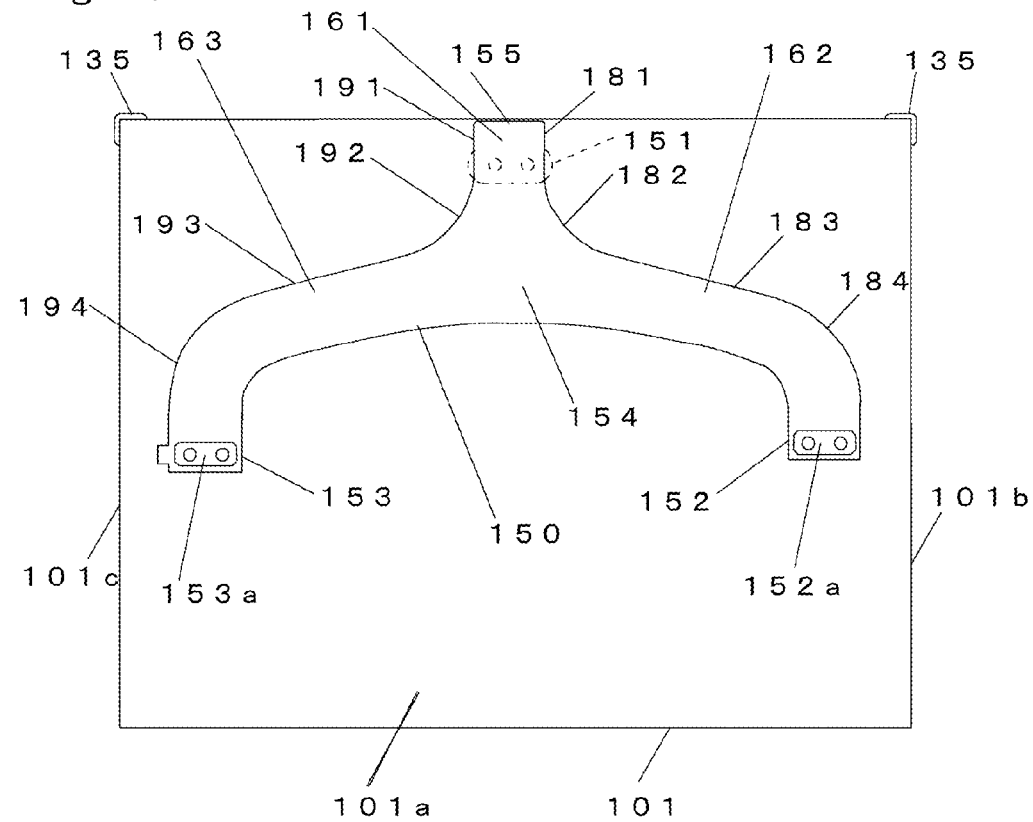
FIG. 3 is a back view of the information processing apparatus according to the first embodiment.
Figure 4:
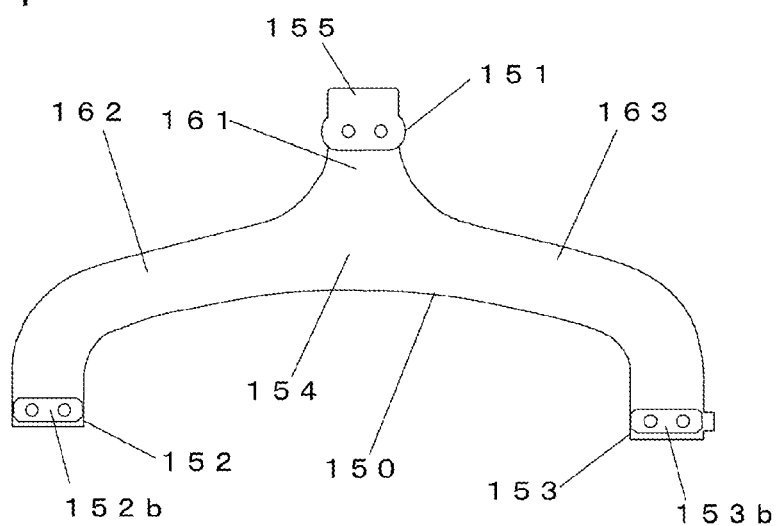
FIG. 4 is a back view of a belt of the first embodiment.
Figure 5:
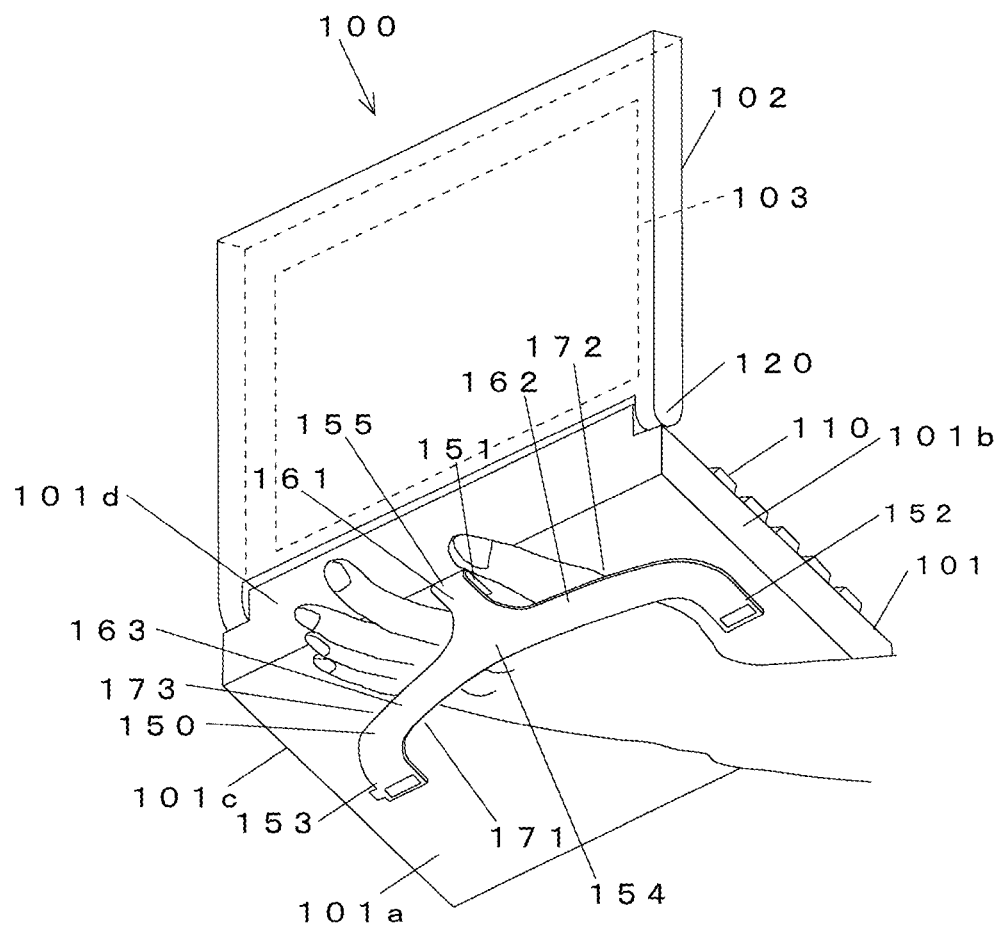
FIG. 5 is a perspective view illustrating a state where the information processing apparatus is held with one hand in the first embodiment.
Figure 6:
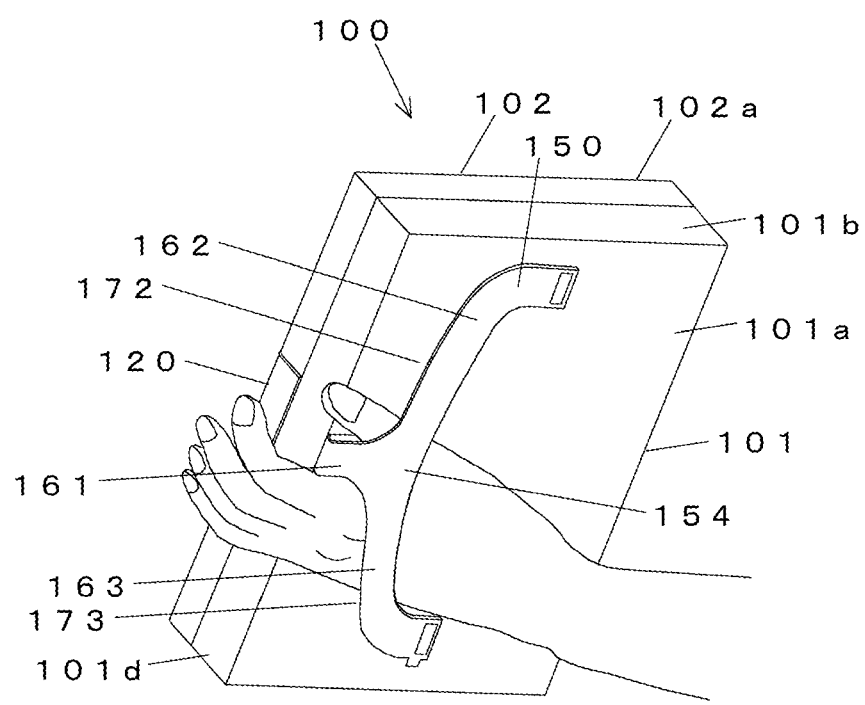
FIG. 6 is a perspective view illustrating a state where the information processing apparatuses of the first embodiment, which is usable as a tablet-type information processing apparatus, is held by one hand with a screen being vertically oriented.

FIG. 1 is a perspective view of a back side of an information processing apparatus 100 according to the present embodiment. FIG. 2 is a perspective view of the back side of the information processing apparatus 100 according to the present embodiment, as viewed from an angle different from that in FIG. 1. In FIG. 2, a second casing 102, an operation section 110, and an opening and closing mechanism 120, which will be described below, are not shown. FIG. 3 is a back view of the information processing apparatus 100 according to the present embodiment. FIG. 4 is a back view of a belt 150 of the present embodiment. FIG. 5 is a perspective view illustrating a state where the information processing apparatus 100 is held with one hand in the present embodiment. FIG. 6 is a perspective view illustrating a state where the information processing apparatuses 100 of the present embodiment, which is usable as a tablet-type information processing apparatus 100, is held by one hand with a screen being vertically oriented.

As shown in FIG. 1, the information processing apparatus 100 of the present embodiment is a notebook computer. The information processing apparatus 100 has: a first casing 101 having the operation section 110 provided on the top surface thereof; the second casing 102 having a display 103 (see FIG. 5) provided thereon; an opening and closing mechanism 120 that connects a far side portion of the first casing 101 to the second casing 102 such that the information processing apparatus 100 is openable and closable; and the belt 150 mounted to the first casing 101 at three portions so as to form a gap between the belt 150 and a back surface 101a of the first casing 101. The operation section 110 is a section that receives, from a user, an operation performed on the information processing apparatus 100, and is implemented as, for example, a keyboard and a touch pad. Further, the opening and closing mechanism 120 is implemented as, for example, a hinge.

Hereinafter, the opening and closing mechanism 120 side of the first casing 101 is referred to as "far side", and a side opposite to the far side is referred to as "near side". Further, surfaces that extend in the far-near direction, among the outer circumferential surfaces (surfaces that extend in the thickness direction of the first casing 101) of the first casing 101, are each referred to as "side surface".

The first casing 101 is a thin casing having a roughly rectangular shape as viewed in a planar manner. The first casing 101 has a CPU, a memory (for example, an HDD), a battery, and the like mounted therein. The operation section 110 as described above is provided on a top surface (upside surface) of the first casing 101. The belt 150 described below, a portion (not shown) through which the battery is removed, and the like are provided on the back surface 101a (underside surface) of the first casing 101. A connection terminal for an electrical cord, a connection port (for example, a USB port) for a peripheral device, and the like (which are not shown) are provided on the outer circumferential surfaces of the first casing 101.

The second casing 102 is a thin casing having a roughly rectangular shape as viewed in a planar manner. The shape and size of the second casing 102 are almost the same as those of the first casing 101 as viewed from the front thereof. The display 103 occupies a large part of one surface of the second casing 102. The display 103 of the second casing 102 is opposed to the keyboard of the first casing 101 in a closed state where the first casing 101 and the second casing 102 are overlaid with each other. In the second casing 102, a surface reverse of the display 103 servers as a shield surface for protecting the information processing apparatus 100.

The information processing apparatus 100 switches from the closed state to an opened state where a user is allowed to view the display 103 by the second casing 102 being pivoted about a rotation shaft of the opening and closing mechanism 120 and opened so as to move away from the near side of the first casing 101.

[1-2. Structure of Belt and Mounting Section]

Firstly, the belt 150 will be described.

The belt 150 is provided on the back surface 101a of the first casing 101 having the operation section 110 provided therein, so as to allow a user to use the information processing apparatus 100 while holding the information processing apparatus 100. As shown in FIG. 2, a gap into which a hand of the user can be inserted is formed by the belt 150 on the back surface 101a of the first casing 101. As shown in FIG. 3 and FIG. 4, the belt 150 is roughly Y-shaped and has three mounting ends 151 to 153. The belt 150 is formed of, for example, an elastomer resin. The belt 150 may be formed of, for example, an extensible hard rubber, or an elastic resin such as a polybutylene terephthalate.

A shape of the belt 150 will be described with reference to FIG. 3. The belt 150 extends from a center portion 154 in three directions. The belt 150 has: the center portion 154; a first band-shaped portion 161 that extends from the center portion 154 to the first mounting end 151; a second band-shaped portion 162 that extends from the center portion 154 to the second mounting end 152; and a third band-shaped portion 163 that extends from the center portion 154 to the third mounting end 153. The belt 150 is provided such that the first mounting end 151 is mounted to the first casing 101 on the far side thereof, the second mounting end 152 is mounted to the first casing 101 on a first side surface 101b side, and the third mounting end 153 is mounted to the first casing 101 on a second side surface 101c side.

As shown in FIG. 3, when the belt 150 is viewed from the front thereof, the first band-shaped portion 161 extends straight from the first mounting end 151 toward the center portion 154. Hereinafter, the direction in which the first band-shaped portion 161 extends is referred to as "short-portion direction of the belt 150", and a direction orthogonal to the short-portion direction of the belt 150 is referred to as "long-portion direction of the belt 150". Further, in a case where the belt 150 is mounted to the first casing 101, a side of the belt 150 which does not oppose the back surface 101a of the first casing 101 is referred to as "front side of the belt 150", and a side of the belt 150 which opposes the back surface 101a of the first casing 101 is referred to as "back side of the belt 150".

The first band-shaped portion 161 has a folded-back portion 155 that is bent toward the back side of the belt 150 so as to fold back the belt 150, as shown in FIG. 2. The folded-back portion 155 is provided near the first mounting end 151 in the belt 150. The first band-shaped portion 161 extends straight from the center portion 154 of the belt 150 in the short-portion direction of the belt 150, and is folded back toward the back side of the belt 150 at the folded-back portion 155, to reach the first mounting end 151. The first mounting end 151 is formed in an elliptical shape (like a race track) obtained by connecting two semicircles with straight lines, as shown in FIG. 4. The first mounting end 151 has formed therein an elliptical recess in which a washer is mounted, and an insertion hole (for example, two insertion holes) for a screw is formed in the recess.

As shown in FIG. 3, the second band-shaped portion 162 extends from the center portion 154 of the belt 150 diagonally relative to the long-portion direction of the belt 150 toward a side opposite to the first band-shaped portion 161 side, and is bent such that a direction in which an outer side portion of the second band-shaped portion 162 extends approaches the short-portion direction of the belt 150, to reach the second mounting end 152. At the second mounting end 152, a recess 152a is formed on the front side of the belt 150, and a projection 152b is formed on the back side of the belt 150. At the second mounting end 152, an insertion hole (for example, two insertion holes) for a screw is formed from the bottom surface of the recess 152a through the top end surface of the projection 152b.

The third band-shaped portion 163 is provided such that the third band-shaped portion 163 and the second band-shaped portion 162 are symmetric with respect to the center line of the first band-shaped portion 161. As shown in FIG. 3, the third band-shaped portion 163 extends from the center portion 154 of the belt 150 diagonally relative to the long-portion direction of the belt 150 toward a side opposite to the first band-shaped portion 161 side, and is bent such that a direction in which an outer side portion of the third band-shaped portion 163 extends approaches the short-portion direction of the belt 150, to reach the third mounting end 153. At the third mounting end 153, a recess 153a is formed on the front side of the belt 150, and a projection 153b is formed on the back side of the belt 150. At the third mounting end 153, an insertion hole (for example, two insertion holes) for a screw is formed from the bottom surface of the recess 153a through the top end surface of the projection 153b.

Next, belt-mounting sections 121 to 123 formed on the back surface 101a of the first casing 101 will be described with reference to FIG. 1 and FIG. 2.

On the back surface 101a of the first casing 101, the first mounting section 121 at which the first mounting end 151 is mounted, the second mounting section 122 at which the second mounting end 152 is mounted, and the third mounting section 123 at which the third mounting end 153 is mounted, are formed. Each of the mounting sections 121 to 123 has a recess formed in the back surface 101a of the first casing 101 and a screw hole (for example, two screw holes) that is open at the bottom surface of the recess.

The recess of the first mounting section 121 is an indentation formed in a roughly rectangular shape, so as to extend from almost the center portion of the long side, on the far side, of the first casing 101 toward the inner side. The first mounting end 151 is mounted to the first mounting section 121 by screws so as to abut against the bottom surface of the recess of the first mounting section 121.

Each of the recesses of the second mounting section 122 and the third mounting section 123 is an indentation that is formed in a roughly rectangular shape, and has an area smaller than the recess of the first mounting section 121. On the back surface 101a of the first casing 101, the recess of the second mounting section 122 is formed slightly inward of the first side surface 101b, and the recess of the third mounting section 123 is formed slightly inward of the second side surface 101c. Each of the recesses of the second mounting section 122 and the third mounting section 123 extends in the long-side direction of the first casing 101. The second mounting end 152 is mounted to the second mounting section 122 by screws with the projection 152b being fitted into the recess of the second mounting section 122. Similarly, the third mounting end 153 is mounted to the third mounting section 123 by screws with the projection 153b being fitted into the recess of the third mounting section 123.

A mounted state will be described in which the three mounting ends 151 to 153 of the belt 150 are mounted to the three mounting sections 121 to 123 of the first casing 101. A state where, to the belt 150, only its own weight is applied (a state where the belt 150 is not pulled or pushed by a user or the like) will be described below.

As shown in FIG. 3, a portion of the belt 150 from the second mounting end 152 to the first mounting end 151 extends diagonally on the back surface 101a of the first casing 101 from the first side surface 101b side of the first casing 101 so as to approach the far side of the first casing 101 as a distance from the first side surface 101b is increased. The portion of the belt 150 is positioned on a far side from a diagonal line, of the back surface 101a of the first casing 101, which extends from a near side of the first side surface 101b to a far side of the second side surface 101c.

As shown in FIG. 3, a portion of the belt 150 from the third mounting end 153 to the first mounting end 151 extends diagonally on the back surface 101a of the first casing 101 from the second side surface 101c side of the first casing 101 so as to approach the far side of the first casing 101 as a distance from the second side surface 101c is increased. The portion of the belt 150 is positioned on a far side from a diagonal line, of the back surface 101a of the first casing 101, which extends from a far side of the first side surface 101b to a near side of the second side surface 101c.

Further, as shown in FIG. 2, the first band-shaped portion 161 is formed such that a gap is formed between a portion from the center portion 154 to the folded-back portion 155, and the back surface 101a of the first casing 101 due to the folded-back portion 155 being provided. The first band-shaped portion 161 is formed so as to gradually increase the gap between the above-described portion and the back surface 101a of the first casing 101 toward the center portion 154, such that the gap is greater in the center portion 154 than in the folded-back portion 155. The folded-back portion 155 projects outward in the short-side direction of the first casing 101 as viewed from a position of the first mounting end 151.

Further, as shown in FIG. 2, the second band-shaped portion 162 abuts against the back surface 101a of the first casing 101 near the second mounting end 152, and a gap between the second band-shaped portion 162 and the back surface 101a of the first casing 101 is gradually increased toward the center portion 154. Similarly, as shown in FIG. 2, the third band-shaped portion 163 abuts against the back surface 101a of the first casing 101 near the third mounting end 153, and a gap between the third band-shaped portion 163 and the back surface 101a of the first casing 101 is gradually increased toward the center portion 154.

Further, the outer end of the folded-back portion 155 is aligned with a long side, on the far side, of the first casing 101 so as to form almost a straight line. The outer end of the folded-back portion 155 is positioned inward of a corner guard 135 provided on the far side of the first casing 101. The corner guard 135 is shown only in FIG. 3. The outer end of the folded-back portion 155 may be positioned inward of the long side, on the far side, of the first casing 101. In this case, the outer end of the folded-back portion 155 is less likely to abut against another object, thereby restraining damage of the folded-back portion 155.

The belt 150 and the back surface 101a of the first casing 101 form three openings 171 to 173 each of which serves as an inlet or an outlet of a hand of a user. The first opening 171 is a front-side opening formed between the back surface 101a of the first casing 101 and an edge of the belt 150 on the near side of the first casing 101, among the edges extending in a direction in which the belt 150 extends. The first opening 171 is an opening having a great width. When the belt 150 is viewed from the front side of the first casing 101, the belt 150 is curved like a bow on the near side thereof. On the other hand, the second opening 172 and the third opening 173 are each a far-side opening formed between the back surface 101a of the first casing 101 and an edge of the belt 150 on the far side of the first casing 101, among the edges extending in the direction in which the belt 150 extends. The second opening 172 and the third opening 173 are formed separately from each other by the first band-shaped portion 161. The second opening 172 is formed between the first side surface 101b and the first band-shaped portion 161, and the third opening 173 is formed between the second side surface 101c and the first band-shaped portion 161. In a state where, to the belt 150, only its own weight is applied, a maximum value of a height of the first opening 171 is greater than each of a maximum value of a height of the second opening 172 and a maximum value of a height of the third opening 173.

Next, a contour of the belt 150 as viewed from the front thereof will be described. The belt 150 is shaped such that the edge on the near side of the first casing 101 among the edges of the belt 150 which extend in the direction in which the belt 150 extends, is formed as a curved line (concave curved line) that is recessed toward the far side of the first casing 101, as shown in FIG. 3. Further, the belt 150 is shaped such that an edge, on the far side, of a portion that extends between the first mounting end 151 and the second mounting end 152, among the edges of the belt 150 extending in the direction in which the belt 150 extends, includes a No. 1-1 straight line section 181 that extends in the short-portion direction of the belt 150, a No. 1-1 curved line section 182 that is recessed toward the center portion 154, a No. 1-2 straight line section 183 that extends diagonally relative to the long-portion direction of the belt 150, and a No. 1-2 curved line section 184 that is bent in a direction opposite to the direction in which the No. 1-2 curved line section 182 is curved, and the No. 1-1 straight line section 181, the No. 1-1 curved line section 182, the No. 1-2 straight line section 183, and the No. 1-2 curved line section 184 continuously extend from the first mounting end 151 side in order, respectively. The No. 1-1 curved line section 182 is recessed so as to be away from a line connecting between the center of the first mounting end 151 and the center of the second mounting end 152. Similarly, the belt 150 is shaped such that an edge, on the far side, of a portion that extends between the first mounting end 151 and the third mounting end 153, among the edges of the belt 150 extending in the direction in which the belt 150 extends, includes a No. 2-1 straight line section 191 that extends in the short-portion direction of the belt 150, a No. 2-1 curved line section 192 that is recessed toward the center portion 154, a No. 2-2 straight line section 193 that extends diagonally relative to the long-portion direction of the belt 150, and a No. 2-2 curved line section 194 that is bent in a direction opposite to the direction in which the No. 2-1 curved line section 192 is curved, and the No. 2-1 straight line section 191, the No. 2-1 curved line section 192, the No. 2-2 straight line section 193, and the No. 2-2 curved line section 194 continuously extend from the first mounting end 151 side in order, respectively. The No. 2-1 curved line section 192 is recessed so as to be away from a line connecting between the center of the first mounting end 151 and the center of the third mounting end 153.

[1-3. Method for Holding Information Processing Apparatus, Effect Thereof, and the Like]

A holding method for holding the information processing apparatus 100 with one hand and using the same in the present embodiment, will be described.

In FIG. 5, a user inserts a hand through the first opening 171, protrudes a thumb through the second opening 172, and protrudes four fingers from an index finger to a little finger through the third opening 173, to hold the back surface 101a of the first casing 101 with a palm of the hand. In this holding method, the first band-shaped portion 161 is held between the thumb and the index finger, thereby enabling the information processing apparatus 100 to be stably held. Further, since the first band-shaped portion 161 is positioned on the far side of the first casing 101, when the user bends all or some of her/his fingers, fingertips abut against an outer circumferential surface 101d, on the far side, of the first casing 101. Therefore, the user is allowed to hold the information processing apparatus 100 with the fingertips abutting against the outer circumferential surface 101d, on the far side, of the first casing 101 while the user holds the first band-shaped portion 161 between the thumb and the index finger.

Further, a user may use a method for holding the back surface 101a of the first casing 101 with a palm of a hand in a state where the user inserts the hand through the first opening 171, and protrudes all the fingers through one of the second opening 172 or the third opening 173. Also in this case, fingertips can be caused to abut against the outer circumferential surface 101d, on the far side, of the first casing 101.

Further, the belt 150 extends from almost the center portion, on the far side, of the first casing 101 to the vicinity of the side surface (the first side surface 101b or the second side surface 101c) of the first casing 101. Therefore, in a case where the number of fingers to be protruded through the third opening 173 is increased, a hand and an arm can be put diagonally relative to the short-side direction of the back surface 101a of the first casing 101 as shown in FIG. 5 instead of putting the hand and the arm along the short-side direction of the back surface 101a of the first casing 101. Further, also in a case where the number of fingers to be protruded through the second opening 172 is increased, a hand and an arm can be put diagonally relative to the short-side direction of the back surface 101a of the first casing 101, which is not illustrated. When the hand and the arm are thus put diagonally, an area in which the hand and the arm of the user contact with the back surface 101a of the first casing 101 is increased. Therefore, the information processing apparatus 100 can be held with enhanced stability.

Further, the first opening 171 of the belt 150 is an opening having an increased width. Therefore, a direction in which a user can insert a hand can be selected with an enhanced degree of freedom. Therefore, the user can select a direction in which the hand is easily inserted.

Further, the belt 150 extends from almost the center portion, on the far side, of the first casing 101 toward the first side surface 101b and the second side surface 101c. Therefore, a user is allowed to hold the information processing apparatus 100 with a right hand or a left hand in the same manner. The belt 150 is roughly Y-shaped so as to be bilaterally symmetric, and is applicable for both a left-handed user and a right-handed user. Further, a user is allowed to select from among various holding manners as compared to a case where the belt 150 extends from almost the center portion, on the far side, of the first casing 101 toward either one of the side surfaces.

Further, the folded-back portion 155 is provided near the first mounting end 151. Therefore, the gap between the belt 150 and the back surface 101a of the first casing 101 is greater near the first mounting end 151 than near the second mounting end 152 and near the third mounting end 153. Furthermore, since the belt 150 is formed of an elastically deformable material, the folded-back portion 155 is elastically deformed in the thickness direction of the first casing 101. The folded-back portion 155 is formed as an elastically deformable portion. Therefore, the gap between the belt 150 and the back surface 101a of the first casing 101 can be further increased near the first mounting end 151 as compared to near the second mounting end 152 and near the third mounting end 153. Therefore, a user is allowed to insert the hand so as to reach the outer side portion of the first band-shaped portion 161, and easily hold the first band-shaped portion 161 between fingers.

Further, since the belt 150 is formed of an elastically deformable material, a hand of a user can be pressed against the back surface of the first casing 101 by utilizing an elastic force of the belt 150. Therefore, a sense of unity between the hand and the belt 150 can be enhanced.

Further, as described above, a maximum value of a height of the first opening 171 is greater than each of a maximum value of a height of the second opening 172 and a maximum value of a height of the third opening 173. Therefore, in a case where a hand is inserted from the first opening 171, a portion of a back of the hand which abuts against the near side portion of the belt 150 is thicker than a portion of the back of the hand which abuts against the far side of the belt 150. Therefore, a sense of fit of the hand to the belt 150 can be enhanced.

Further, the belt 150 is shaped such that the edge of the belt 150 which extends in the direction in which the belt 150 extends, includes, on the far side of the belt 150, the No. 1-1 curved line section 182 and the No. 2-1 curved line section 192 that are recessed toward the center portion 154. Therefore, the second joint or the third joint of a finger can be easily protruded from the second opening 172 or the third opening 173 of the belt 150. The joint that is protruded from the second opening 172 or the third opening 173 toward the far side, is likely to be caught by the belt 150, thereby enabling the information processing apparatus 100 to be held with enhanced stability. Further, the information processing apparatus 100 held with a palm of a hand can be restrained from rotating.

Further, when a user holds the information processing apparatus 100 so as to vertically orient the display 103 having a roughly rectangular shape, the first band-shaped portion 161 of the belt 150 is caught between a thumb and an index finger of the user. Therefore, the weight of the information processing apparatus 100 is supported by a portion of the hand by which the first band-shaped portion 161 is caught, thereby allowing the user to easily hold the information processing apparatus 100. When the display 103 can be used with the display 103 being vertically oriented, the information processing apparatus 100 is structured so as to enable switching between a state where an image is displayed on the display 103 so as to be horizontally oriented, and a state where an image is displayed on the display 103 so as to be vertically oriented. In this case, for example, the information processing apparatus 100 detects an orientation of the information processing apparatus 100, and performs image rotation processing for rotating the image for the display 103 according to the detection result.

Further, in the information processing apparatus 100, a two-axis hinge may be used as the opening and closing mechanism 120. In this case, as shown in FIG. 6, the information processing apparatus 100 can be used in a state of a tablet where the information processing apparatus 100 is closed with a front surface 102a of the second casing 102 on which the display 103 is provided facing a side opposite to the first casing 101 side. Also in this case, in a case where a user holds the information processing apparatus 100 so as to vertically orient the display 103, the weight of the information processing apparatus 100 is supported between a thumb and an index finger by which the first band-shaped portion 161 is caught, thereby enabling the information processing apparatus 100 to be easily held.

Second Embodiment

Figure 7:
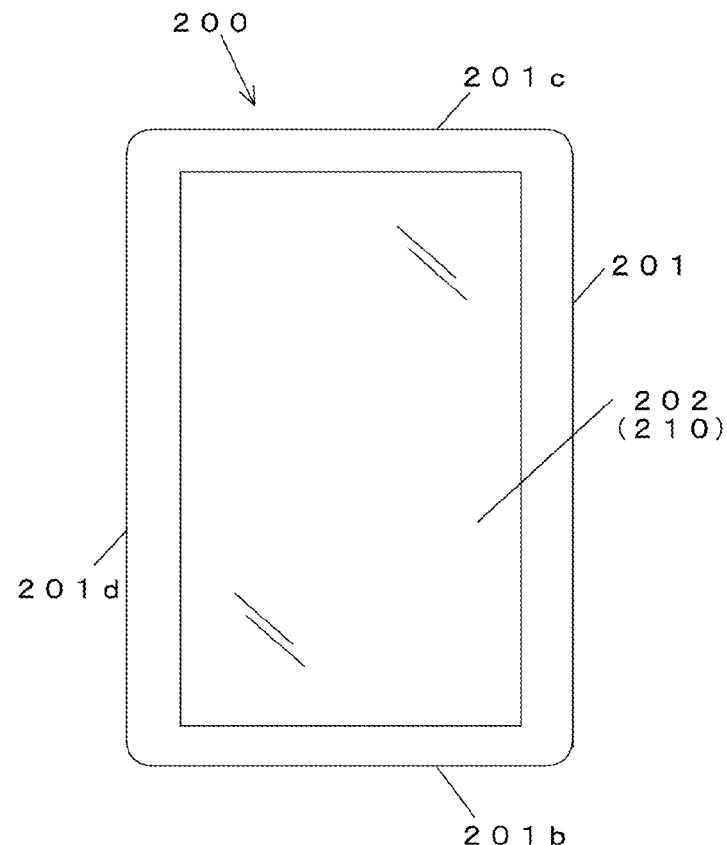
FIG. 7 is a front view of an information processing apparatus according to a second embodiment.
Figure 8:
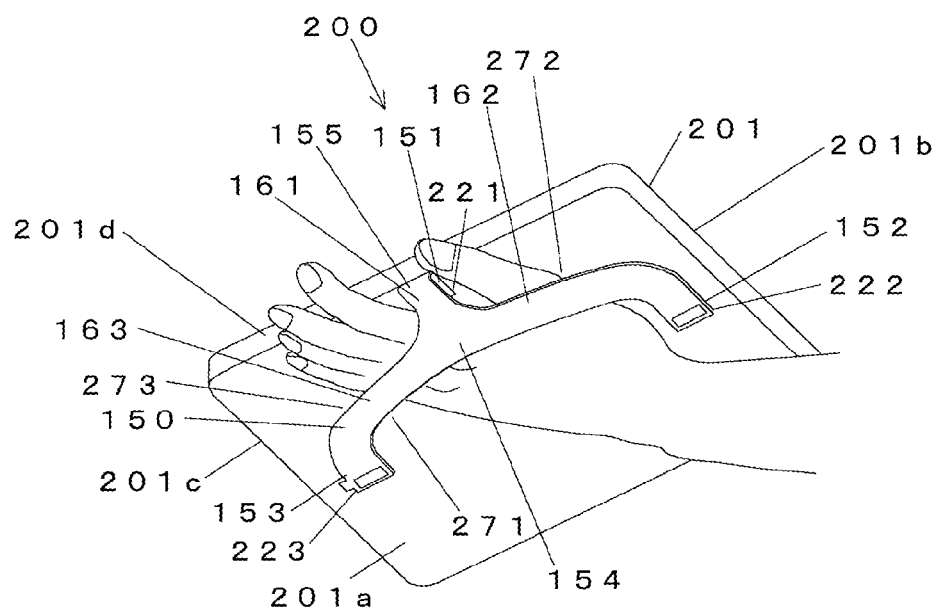
FIG. 8 is a perspective view illustrating a state where the information processing apparatus of the second embodiment is held with one hand.

Hereinafter, a second embodiment will be described with reference to FIG. 7 and FIG. 8. FIG. 7 illustrates a top surface of an information processing apparatus 200 according to the present embodiment. FIG. 8 is a perspective view of a back side of the information processing apparatus 200 according to the present embodiment.

[2-1. Structure of Information Processing Apparatus]

As shown in FIG. 7 and FIG. 8, the information processing apparatus 200 of the present embodiment is a tablet-type information processing terminal (for example, a PDA (Personal Digital Assistant)). The information processing apparatus 200 includes a casing 201 having a display 202 and an operation section 210 (for example, a touch panel) provided on the top surface, and the belt 150 that is mounted to the casing 201 at three portions so as to form a gap between the belt 150 and a back surface 201a of the casing 201. The casing 201 is a thin casing having a roughly rectangular shape as viewed in a planar manner. The casing 201 has mounted therein a CPU, a memory (for example, an HDD), a battery, and the like. The belt 150 described below, and the like are provided on the back surface 201a (an underside surface) of the casing 201.

The information processing apparatus 200 performs image rotation processing for rotating an image to be displayed on the display 202 according to an orientation of the casing 201. When the casing 201 is horizontally oriented, the information processing apparatus 200 is put into a state where the display 202 is horizontally oriented and used (a state where a short-side direction of the display 202 corresponds to an upper-lower direction of an image), and when the casing 201 is vertically oriented, the information processing apparatus 200 is put into a state where the display 202 is vertically oriented and used (a state where a long-side direction of the display 202 corresponds to an upper-lower direction of an image). An image can be displayed on the display 202 such that a first long side 201d (an upper left long side in FIG. 8) that is a part of the outer circumference of the casing 201 corresponds to the upper side.

[2-2. Structure of Belt]

As shown in FIG. 8, the belt 150 is the same as the belt for the first embodiment. The first mounting end 151 of the belt 150 is mounted to a first mounting section 221 formed on the first long side 201d side on the back surface 201a of the casing 201. The second mounting end 152 of the belt 150 is mounted to a second mounting section 222 that is formed on the back surface 201a of the casing 201 on a first short side 201b side which is one of the short sides. The third mounting end 153 of the belt 150 is mounted to a third mounting section 223 that is formed on the back surface 201a of the casing 201 on a second short side 201c side opposing the first short side 201b.

A mounted state where the three mounting ends 151 to 153 of the belt 150 are mounted to the three mounting sections 221 to 223 of the casing 201, will be described. A state where, to the belt 150, only its own weight is applied (a state where the belt 150 is not pulled or pushed by a user or the like), will be described below.

As shown in FIG. 8, a portion of the belt 150 from the second mounting end 152 to the first mounting end 151 extends from the first short side 201b side of the casing 201 diagonally on the back surface 201a of the casing 201 so as to approach the first long side 201d of the casing 201 as a distance from the first short side 201b is increased. Further, as shown in FIG. 8, a portion of the belt 150 from the third mounting end 153 to the first mounting end 151 extends from the second short side 201c side of the casing 201 diagonally on the back surface 201a of the casing 201 so as to approach the first long side 201d of the casing 201 as a distance from the second short side 201c is increased. Further, the outer end of the folded-back portion 155 is aligned with the first long side 201d of the casing 201 so as to form almost a straight line. The outer end of the folded-back portion 155 may be positioned inward of the first long side 201d of the casing 201.

The belt 150 and the back surface 201a of the casing 201 form three openings 271 to 273 each of which serves as an inlet or an outlet of a hand of a user. The first opening 271 is an opening formed between the back surface 201a of the casing 201 and an edge of the belt 150 which is opposite to an edge on the first long side 201d side among edges of the belt 150 which extend in a direction in which the belt 150 extends. On the other hand, the second opening 272 and the third opening 273 are each an opening formed between the back surface 201a of the casing 201 and an edge on the first long side 201d side among the edges of the belt 150 which extend in the direction in which the belt 150 extends. In a state where, to the belt 150, only its own weight is applied, a maximum value of a height of the first opening 271 is greater than a maximum value of a height of the second opening 272 and a maximum value of a height of the third opening 273.

In the casing 201 of the present embodiment, the second short side 201c corresponds to the upper side. For example, characters are indicated on the front surface or the back surface of the casing 201 such that the second short side 201c is the upper side. The first long side 201d corresponds to the left side of the casing 201 in FIG. 7. The belt 150 may be provided at a position opposite to that for the present embodiment such that the first mounting end 151 is mounted on the right long edge side of the casing 201 in FIG. 7.

In the present embodiment, as described above, since an image to be displayed on the display 202 is rotated according to an orientation of the casing 201, a user is allowed to use the information processing apparatus 200 such that the display 202 having a roughly rectangular shape is vertically oriented, in a manner different from that in FIG. 8. In such a case, the first band-shaped portion 161 of the belt 150 is caught between a thumb and an index finger of a user. Therefore, the user supports the weight of the information processing apparatus 200 with a portion of a hand by which the first band-shaped portion 161 is caught, thereby enabling the information processing apparatus 200 to be easily held.

Other Embodiments

As described above, the first and the second embodiments have been described above as examples of the technology disclosed in the present application. However, the technology according to the present disclosure is not limited to these embodiments, and is also applicable to other embodiments realized by modification, replacement, addition, omission, or the like as appropriate. Furthermore, another embodiment can be realized by combining the components described in the first and the second embodiments.

Hereinafter, other embodiments will be described.

In the first and the second embodiments, the folded-back portion 155 is described as an exemplary elastically deformable portion. However, the elastically deformable portion is not limited thereto. For example, the elastically deformable portion may be a band-shaped rubber having an extensibility higher than that of a belt body portion of the belt 150.

Further, in the first and the second embodiments, the folded-back portion 155 is elastically deformed. However, the folded-back portion 155 may be formed of a material which is not elastically deformed.

Further, in the first and the second embodiments, in a case where a leg portion is provided on the far side of the casing, the center portion 154 of the belt 150 may be protruded more greatly than a lower end of the leg portion. Thus, if the information processing apparatus is dropped on its bottom, the belt 150 acts as a cushion.

Further, in the first and the second embodiments, the first mounting end 151 is mounted to the back surface of the casing. However, the first mounting end 151 may be mounted to the outer circumferential surface, on the far side, of the casing. In this case, the folded-back portion 155 may be protruded outward of the casing, or downward of the casing.

Further, in the first and the second embodiments, the second mounting end 151 and the third mounting end 152 are mounted to the back surface of the casing. However, the second mounting end 151 and the third mounting end 152 may be mounted to the side surfaces of the casing.

Figure 9:
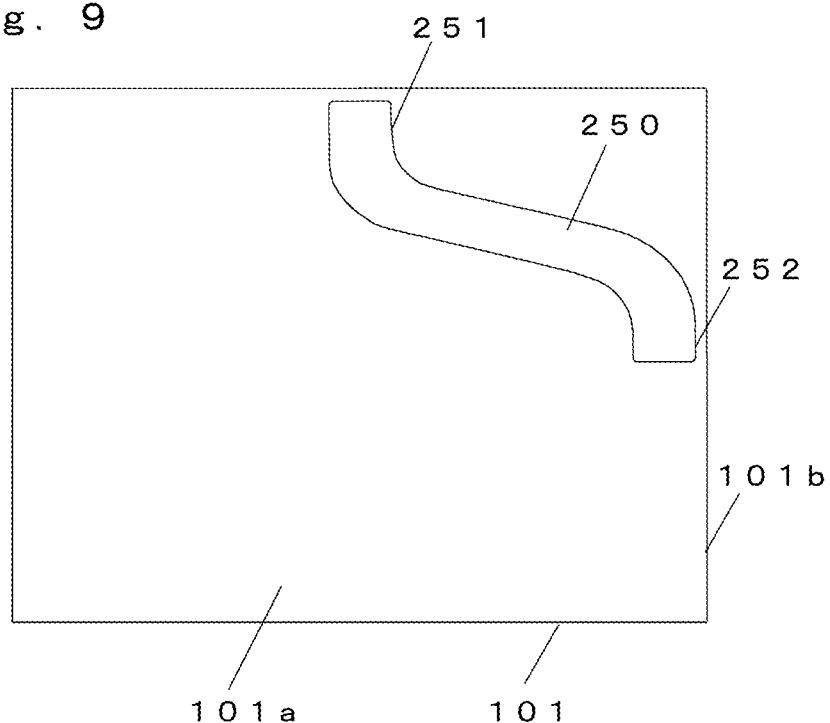
FIG. 9 is a back view of an information processing apparatus, according to another embodiment, which has a belt which is mounted at two portions.

Further, in the first and the second embodiments, the belt 150 that is mounted to the information processing apparatus 100 at three portions is described as an exemplary belt. However, the belt is not limited thereto. For example, as shown in FIG. 9, a belt 250 that is mounted to the information processing apparatus 100 at two portions may be used. In this case, a portion of the belt 250 from a first mounting end 251 to a second mounting end 252 extends diagonally on the back surface 101a of the casing 101 from one side surface 101b of the casing 101 in which an operation section is provided on the top surface, so as to approach the far side of the casing 101 as a distance from the one side surface 101b is increased.

Further, in the first and the second embodiments, the belt 150 having the folded-back portion 155 provided near the first mounting end 151 is described as an exemplary belt. However, the belt 150 is not limited thereto. For example, the belt 150 may not have the folded-back portion 155 provided therein. The belt 150 may have folded-back portions provided near the second mounting end 152 and the third mounting end 153.

Figure 10:
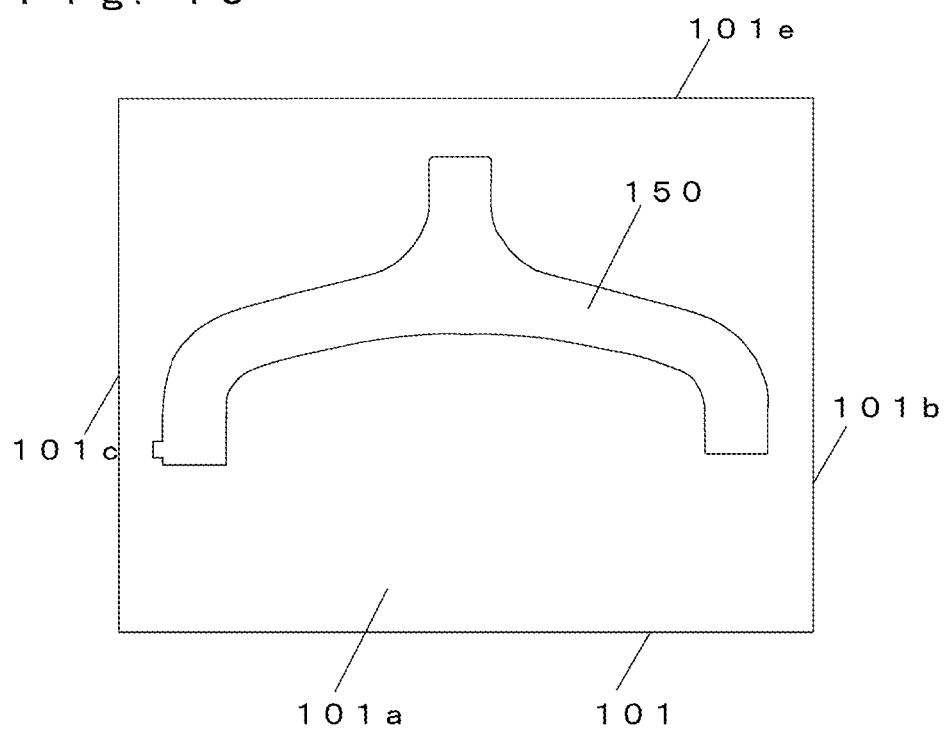
FIG. 10 is a back view of an information processing apparatus, according to still another embodiment, which has a belt mounted at a portion different from portions for the first and the second embodiments.

Further, in the first and the second embodiments, the first mounting end 151 of the belt 150 is mounted near almost the center portion of the long side of the casing. However, as shown in FIG. 10, the first mounting end 151 of the belt 150 may be mounted on one long side 101e side of the casing 101 in the short-side direction, and the first mounting end 151 of the belt 150 may be mounted so as to be away from the long side 101e on the long side 101e side. Further, the first mounting end 151 of the belt 150 may be mounted between one of the short sides and the center portion of the long side 101e in the long-side direction of the casing 101.

Further, in the first and the second embodiments, the second mounting end 152 and the third mounting end 153 of the belt 150 are each mounted at almost the center portion of the side surface on the back surface of the casing. However, the second mounting end 152 and the third mounting end 153 of the belt 150 may be mounted on the near side of the casing.

Further, in the first and the second embodiments, the casing to which the belt 150 is mounted has a roughly rectangular shape as viewed in a planar manner. However, the casing to which the belt 150 is mounted may have, for example, a roughly square shape as viewed in a planar manner.

As described above, the embodiments have been described as an exemplary technique of the present disclosure. For that purpose, the accompanying drawings and the detailed description are provided.

Therefore, components indicated in the accompanying drawings and the detailed description may include not only components which need to be provided in order to solve the problems, but also components which need to be illustrated for describing the technique but may not be provided for solving the problems. Therefore, the components which may not be provided should not be instantly construed as being indispensable even if the components which may not be provided are indicated in the accompanying drawings and the detailed description.

Further, the embodiments described above are intended to illustrate the technique of the present disclosure. Various modifications, replacements, additions, omissions, or the like may be devised within the scope of claims or within the equivalent scope.

What is claimed is:

1. An information processing apparatus comprising:
   a first casing having top and bottom surfaces and an operation section provided on the top surface;
   a second casing having a display provided thereon, the second casing being mounted to the first casing with an opening and closing mechanism such that the information processing apparatus is openable and closable; and
   a belt provided on the bottom surface of the first casing, wherein
   the first casing has first and second sides and first and second ends that extend between the top and bottom surfaces, the first and second sides extending between the first and second ends, and the opening and closing mechanism being provided at the first end,
   the belt comprises:
      a first section that is secured to the bottom surface at a first location at the first side of the first casing and extends diagonally along the bottom surface of the first casing from the first location so as to approach the first end of the first casing as a distance from the first location increases; and
      a second section that is secured to the bottom surface at a second location at the first end of the first casing and extends toward the second end of the casing,
      the first section of the belt further being secured to the bottom surface of the first casing at a third location at the second side of the first casing,
      the second section intersecting the first section at a position on the side of the first end relative to a line connecting the first location and the third location,
      the second section being configured to engage an area between a thumb and index finger of a user, and
      an edge of the first section of the belt on the side of the second end of the first casing and extending from the first location to the third location being recessed toward the first end of the first casing relative to the line connecting the first location and the third location,
   the belt has a back side that opposes the back surface of the first casing, and
   the belt has a folded-back portion that is bent toward the back side of the belt and folded back, and the folded-back portion is provided near at least one of the first and second locations.

2. The information processing apparatus according to claim 1, wherein the folded-back portion of the belt is provided only near the second location.

3. The information processing apparatus according to claim 1, wherein the folded-back portion of the belt is provided near the second location, and an outer end of the folded-back portion is positioned so as not to extend beyond the first end of the first casing.

* * * * *